(12) United States Patent
Okamura

(10) Patent No.: US 11,358,536 B2
(45) Date of Patent: Jun. 14, 2022

(54) DETECTION APPARATUS

(71) Applicant: HONDA MOTOR CO., LTD., Tokyo (JP)

(72) Inventor: Yusuke Okamura, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 371 days.

(21) Appl. No.: 16/681,994

(22) Filed: Nov. 13, 2019

(65) Prior Publication Data
US 2020/0180518 A1   Jun. 11, 2020

(30) Foreign Application Priority Data
Dec. 7, 2018   (JP) .............................. JP2018-230274

(51) Int. Cl.
*B60R 11/00* (2006.01)
*B60R 11/04* (2006.01)

(52) U.S. Cl.
CPC ............... *B60R 11/00* (2013.01); *B60R 11/04* (2013.01); *B60R 2011/004* (2013.01); *B60R 2011/0043* (2013.01)

(58) Field of Classification Search
CPC combination set(s) only.
See application file for complete search history.

(56) References Cited

U.S. PATENT DOCUMENTS

| 7,938,376 | B2 * | 5/2011 | Jimenez | ................. | B60R 11/00 248/316.7 |
| 9,337,771 | B2 * | 5/2016 | Guo | ........................ | H02S 40/34 |
| 9,802,550 | B2 | 10/2017 | Kageyama et al. | | |
| 9,804,261 | B2 | 10/2017 | Dechoux | | |
| 10,493,934 | B2 * | 12/2019 | Fernandez | ................ | G01S 7/02 |
| 10,793,095 | B2 * | 10/2020 | Horiuchi | ................. | B60R 21/00 |
| 2002/0088662 | A1 * | 7/2002 | Kleinberg | ............. | B60R 21/013 180/282 |
| 2005/0062641 | A1 * | 3/2005 | Kakishita | ............. | G01S 7/2813 342/70 |

(Continued)

FOREIGN PATENT DOCUMENTS

JP   2016-159875 A   9/2016
JP   2016-190616 A   11/2016

(Continued)

OTHER PUBLICATIONS

Japanese Office Action (with partial translation) for Japanese Patent Application No. 2018-230274 dated Nov. 1, 2021.

*Primary Examiner* — Monica E Millner
(74) *Attorney, Agent, or Firm* — Thomas | Horstemeyer, LLP

(57) ABSTRACT

A detection apparatus includes a detection unit configured to detect a peripheral environment of a vehicle and a bracket configured to attach the detection unit to a vehicle body. The detection unit includes a front surface portion, a back surface portion, and side surface portions. The bracket includes a bottom wall portion and a first guiding portion configured to guide the attachment of the detection unit to the bracket. When the detection unit is attached to the bracket by diagonally inserting one end of the detection unit towards the bottom wall portion and pivoting the detection unit about a side of the one end as a rotation center, the first guiding portion restricts a position of the one end.

5 Claims, 10 Drawing Sheets

(56) References Cited

U.S. PATENT DOCUMENTS

| | | | |
|---|---|---|---|
| 2014/0354465 A1* | 12/2014 | Lee | G01S 7/02 342/70 |
| 2016/0137230 A1* | 5/2016 | Taneda | G01S 7/02 296/193.09 |
| 2016/0257265 A1 | 9/2016 | Kageyama et al. | |
| 2016/0291151 A1 | 10/2016 | Dechoux | |
| 2018/0236958 A1 | 8/2018 | Horiuchi et al. | |

FOREIGN PATENT DOCUMENTS

| | | |
|---|---|---|
| JP | 2018-134936 A | 8/2018 |
| WO | 2015/072289 A1 | 5/2015 |

* cited by examiner

FIG. 3

DETECTION APPARATUS

CROSS-REFERENCE TO RELATED APPLICATION(S)

This application claims priority to and the benefit of Japanese Patent Application No. 2018-230274 filed on Dec. 7, 2018, the entire disclosure of which is incorporated herein by reference.

BACKGROUND OF THE INVENTION

Field of the Invention

The present invention relates to a detection apparatus that detects the peripheral environment of a vehicle.

Description of the Related Art

In a vehicle that includes a driving assistance function for a driver in the manner of an automated driving vehicle, a detection unit such as a radar or the like for detecting the peripheral environment of the vehicle is arranged. As a structure for attaching a detection unit to a vehicle body, the pamphlet of International Publication No. WO 2015/072289 discloses a structure in which a radar main body is slid and inserted into a slot-shaped installation portion.

However, depending on the structure of the detection unit and the installation position of the detection unit, a structure in which the detection unit (radar main body) is slid and inserted in the manner of the structure disclosed in International Publication No. WO 2015/072289 may not be adoptable. Thus, another attachment structure is required.

SUMMARY OF THE INVENTION

The object of the present invention is to provide a structure which allows a detection unit to be pivotally attached to a bracket.

According to an aspect of the present invention, there is provided a detection apparatus comprising a detection unit configured to detect a peripheral environment of a vehicle and a bracket configured to attach the detection unit to a vehicle body, wherein the detection unit includes a front surface portion including an exposed portion exposed from the bracket in a detection direction of the detection unit, a back surface portion on a side opposite to the front surface portion in a thickness direction of the detection unit, and side surface portions between the front surface portion and the back surface portion, and the bracket includes a bottom wall portion facing the back surface portion, and a first guiding portion configured to guide the attachment of the detection unit to the bracket, and when the detection unit is attached to the bracket by diagonally inserting one end of the detection unit towards the bottom wall portion and pivoting the detection unit about a side of the one end as a rotation center, the first guiding portion restricts a position of the one end.

Further features of the present invention will become apparent from the following description of exemplary embodiments (with reference to the attached drawings).

BRIEF DESCRIPTION OF THE DRAWINGS

FIG. 3 is an explanatory view of a bracket;

DESCRIPTION OF THE EMBODIMENTS

Figure 1:
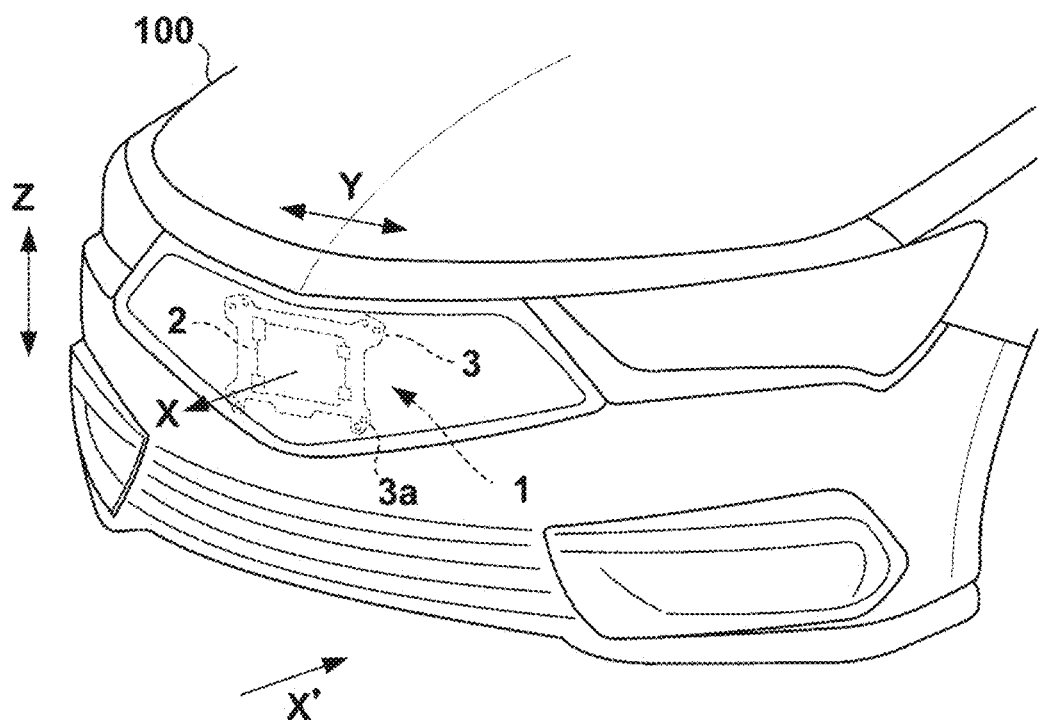
FIG. 1 is a view showing an example of the application of a detection apparatus to a vehicle according to an embodiment of the present invention.

FIG. 1 is a view showing an example of the application of a detection apparatus 1 to a vehicle 100 according to an embodiment of the present invention. The detection apparatus 1 includes a detection unit 2 that detects the peripheral environment of the vehicle 100 and a bracket 3 for attaching the detection unit 2 to the vehicle body of the vehicle 100. Although the detection unit 2 is a millimeter wave radar in the case of this embodiment, another sensor such as LiDAR, an ultrasonic wave sensor, an imaging sensor (camera), or the like may be used. In the case of this embodiment, the detection apparatus 1 is arranged at the center (behind the front grille) of the front portion in a vehicle width direction of the vehicle 100, and detects an object target positioned in front of the vehicle 100. However, the arrangement of the detection apparatus 1 is not limited to this, and the detection apparatus 1 may be arranged on other parts such as the ends of the front portion in the vehicle width direction of the vehicle 100, the sides of the vehicle 100, the rear portion of the vehicle 100, and the like.

In FIG. 1, arrows X and X' indicate the front direction and the rear direction, respectively in the front-and-rear direction of the vehicle 100. An arrow Y indicates the vehicle width direction (horizontal direction) of the vehicle 100, and an arrow Z indicates the vertical direction. In the case of this embodiment, the detection direction (the direction in the center of the detection range) of the detection unit 2 is the X direction. In the explanation of the detection apparatus 1 hereinafter, the X, X', Y, and Z directions which are the directions set when the detection apparatus is mounted on the vehicle will be used as the reference for the sake of descriptive convenience. In addition, each sectional view is shown as an end view and expressed so that a bottom wall portion 30 will be positioned on the lower side of a drawing for the sake of descriptive convenience.

<Outline of Arrangement of Detection Apparatus>

Figure 2:
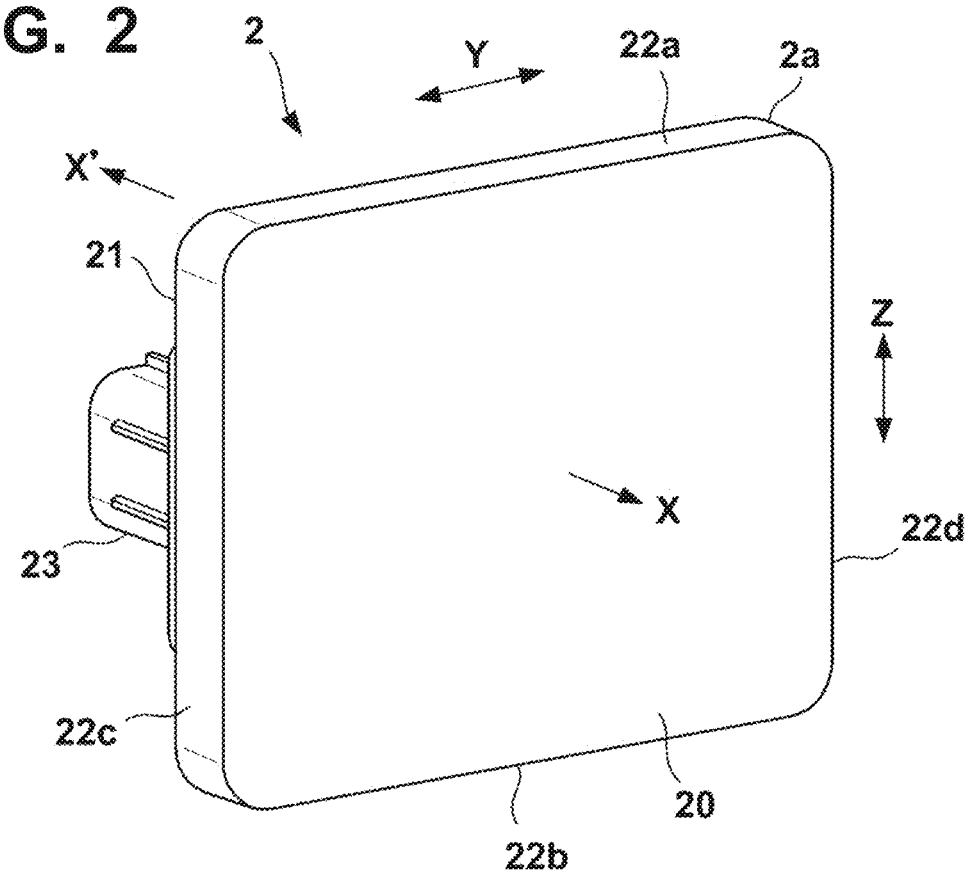
FIG. 2 is a perspective view of a detection unit.

FIG. 2 is a perspective view of a detection unit 2 which is a radar. An electrical circuit of the detection unit 2 is stored in a housing 2a having a flat cuboid shape. The housing 2a includes a front surface portion 20, a back surface portion 21 on a side opposite to the front surface portion 20 in the thickness directions (the X direction and the X' direction in this case), and side surface portions 22a to 22d arranged between the front surface portion 20 and the back surface portion 21. A connector 23 for connecting the electrical circuit in the housing 2a to an external electrical circuit is arranged on the back surface portion 21, and the connector 23 protrudes from the back surface portion 21 in the X' direction. The side surface portions 22a to 22d include the upper side surface portion 22a, the lower side surface portion 22b, the right side surface portion 22c, and the left side surface portion 22d. The transmission of signals and the reception of reflected signals to/from the electrical circuit stored inside the housing 2a are performed via the front surface portion 20, and the signals are transmitted/received via the center portion excluding the four corners of the front surface portion 20.

The four corners of the front surface portion 20 and the side surface portions 22a and 22c are reference surfaces with respect to the detection direction according to the specification of the detection unit 2. The four corners of the front surface portion 20 are surfaces perpendicular to the detection direction. The side surface portions 22a to 22d are surfaces parallel to the detection direction, and the side surface portions 22a and 22b and the side surface portions 22c and 22d are surfaces perpendicular to each other. These surfaces become the positioning reference when the detection unit 2 is to be mounted on the vehicle, in other words, these surfaces become the reference for positioning the detection unit 2 with respect to the bracket 3. Note that the reference surfaces described above are an example, and all of the side surface portions 22a to 22d may be set as reference surfaces.

Figure 3:
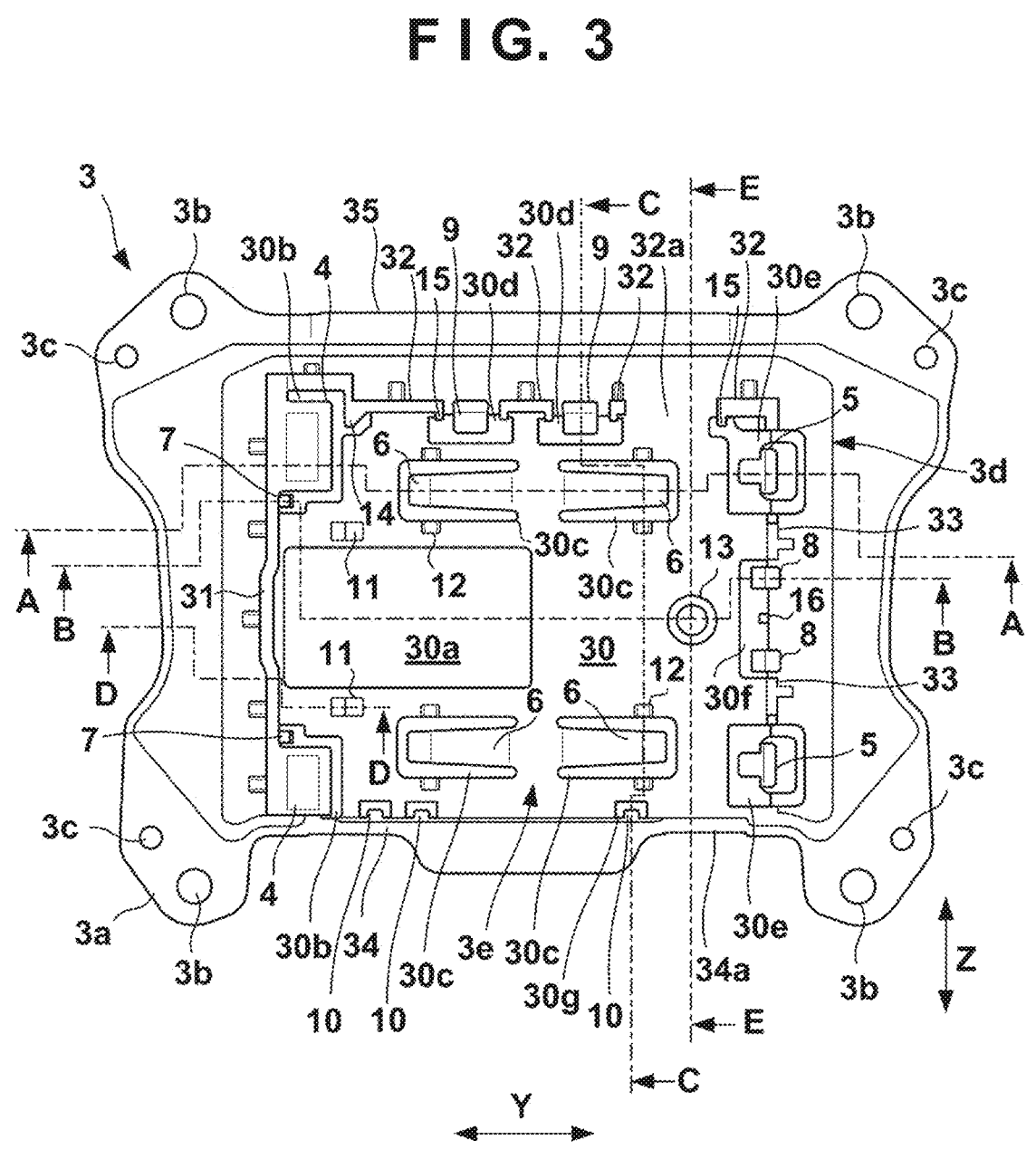
Figure 4:
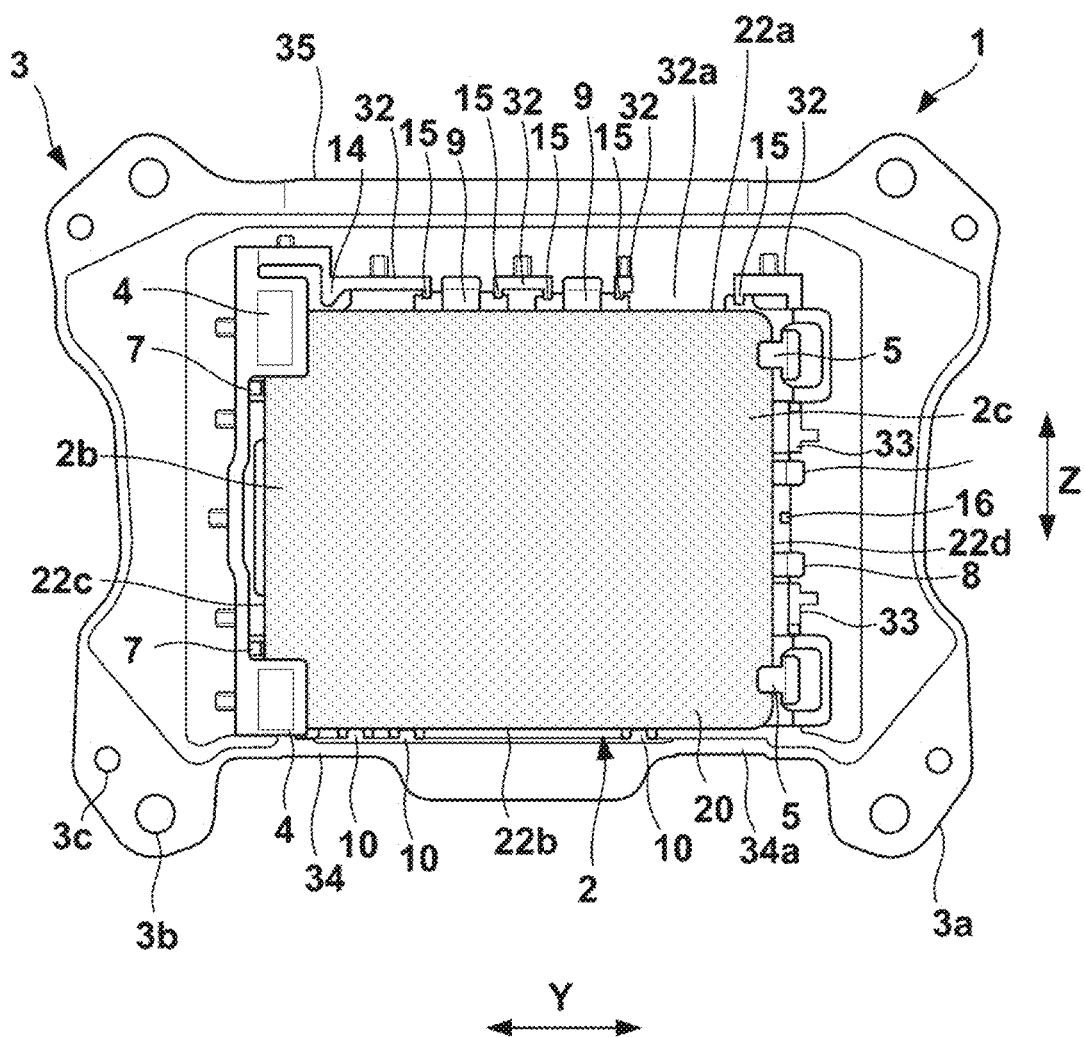
FIG. 4 is an explanatory view of the detection apparatus.

FIG. 3 is a plan view of the bracket 3 when viewed in the X' direction, and FIG. 4 is a plan view of the bracket 3 attached with the detection unit 2 (that is, the detection apparatus 1) when viewed in the X' direction. The bracket 3 includes a peripheral portion 3a and a recessed portion 3d which is recessed from the peripheral portion 3a in the X' direction, and a storage space 3e of the detection unit 2 is formed in the recessed portion 3d. The four corners of the peripheral portion 3a are formed into ear-shaped flange portions, and attachment holes 3b and 3c are provided in each flange portion. The attachment holes 3b and 3c are used to fix the detection apparatus 1 to the vehicle body of the vehicle 100 by screws or positioning members.

The storage space 3e is surrounded by the bottom wall portion 30 (the wall portion on the far side in the X' direction) forming its bottom portion and side wall portions 31 to 34 erected from the bottom wall portion 30 in the X direction on all sides. The side wall portion 31 is the right side wall portion and extends continuously in the X direction. The side wall portion 33 is the left side wall portion and extends in the Z direction. The side wall portion 33 is different from the side wall portion 31 in that it is not a continuous wall portion and breaks halfway. The side wall portion 31 and the side wall portion 33 face each other.

The side wall portion 32 is the upper side wall portion and extends in the Y direction. The side wall portion 32 is a wall portion that breaks halfway. The side wall portion 34 is the lower side wall portion and extends continuously in the Y direction. The side wall portion 32 and the side wall portion 34 face each other.

The side wall portion 32 and the side wall portion 34 are positioned between the side wall portion 31 and the side wall portion 33. On the other hand, the side wall portion 31 and the side wall portion 33 are positioned between the side wall portion 32 and the side wall portion 34. At the attachment of the detection unit 2, the side wall portion 31 faces the side surface portion 22c of the detection unit 2, and the side wall portion 33 faces the side surface portion 22d of the detection unit 2. Also, the side wall portion 32 faces the side surface portion 22a of the detection unit 2, and the side wall portion 34 faces the side surface portion 22b.

The peripheral portion 3a includes a wall portion 35 defining the outer shape of the upper side of the bracket 3. The wall portion 35 is arranged spaced apart from the side wall portion 32 to the outer side (upper side) in Z direction, and is a wall portion extending in the Y direction. That is, the upper side of the storage space 3e has a double-wall structure formed by the side wall portion 32 and the wall portion 35, and the wall portion 35 functions as a reinforcing wall portion. On the other hand, the lower side of the storage space 3e has a single-wall structure formed by the side wall portion 34 which defines the outer shape of the lower side of the bracket 3.

A plurality of holes 30a to 30g that penetrate the bottom wall portion 30 in the thickness direction are formed in the bottom wall portion 30. The hole 30a is a hole through which the connector 23 is inserted. The holes 30b are formed in two locations, and each hole 30b is formed in a position which faces and surrounds a corresponding one of two engaging portions 4. The holes 30c are formed in four locations, and are provided to form pressing portions 6 arranged on the bottom wall portion 30. The holes 30d are formed in two locations, and each hole 30d is formed to surround a corresponding one of two pressing portions 9. The holes 30e are formed in two locations, and each hole 30e is formed to surround a corresponding one of two engaging portions 5. The hole 30f is formed in a single location and is formed to surround two pressing portions 8. The holes 30g are formed in three locations, and each hole 30g is formed in a position that faces and surrounds a corresponding one of three positioning portions 10.

Each of the two engaging portions 4 is a plate-like locking piece which protrudes from the side wall portion 31 toward the inner side of the storage space 3e in the Y direction. The two engaging portions 4 are formed spaced apart from each other in the Z direction, and abut against two corners (positioning reference) on the side of the side surface portion 22c, among the four corners of the front surface portion 20 of the detection unit 2, when the detection unit 2 is attached.

Each of the two engaging portions 5 is arranged on the side of the side wall portion 33 and is a plate-like locking piece which protrudes toward the inner side of the storage space 3e in the Y direction. The two engaging portions 5 are formed spaced apart from each other in the Z direction, and abut against the two corners (positioning reference) on the side of the side surface portion 22d in the X' direction, among the four corners of the front surface portion 20 of the detection unit 2, when the detection unit 2 is attached. The two engaging portions 5 are arranged so as to face the two engaging portions 4 in the Y direction.

The bracket 3 holds the detection unit 2 by sandwiching the detection unit between the bottom wall portion 30 and the engaging portions 4 and 5. When the detection unit is attached to the bracket, the four corners of the front surface portion 20 of the detection unit 2 are slightly covered by the engaging portions 4 and 5, but the remaining part is exposed (exposed portion) in the X direction.

<Attachment Structure and Positioning Structure>

Figure 5:
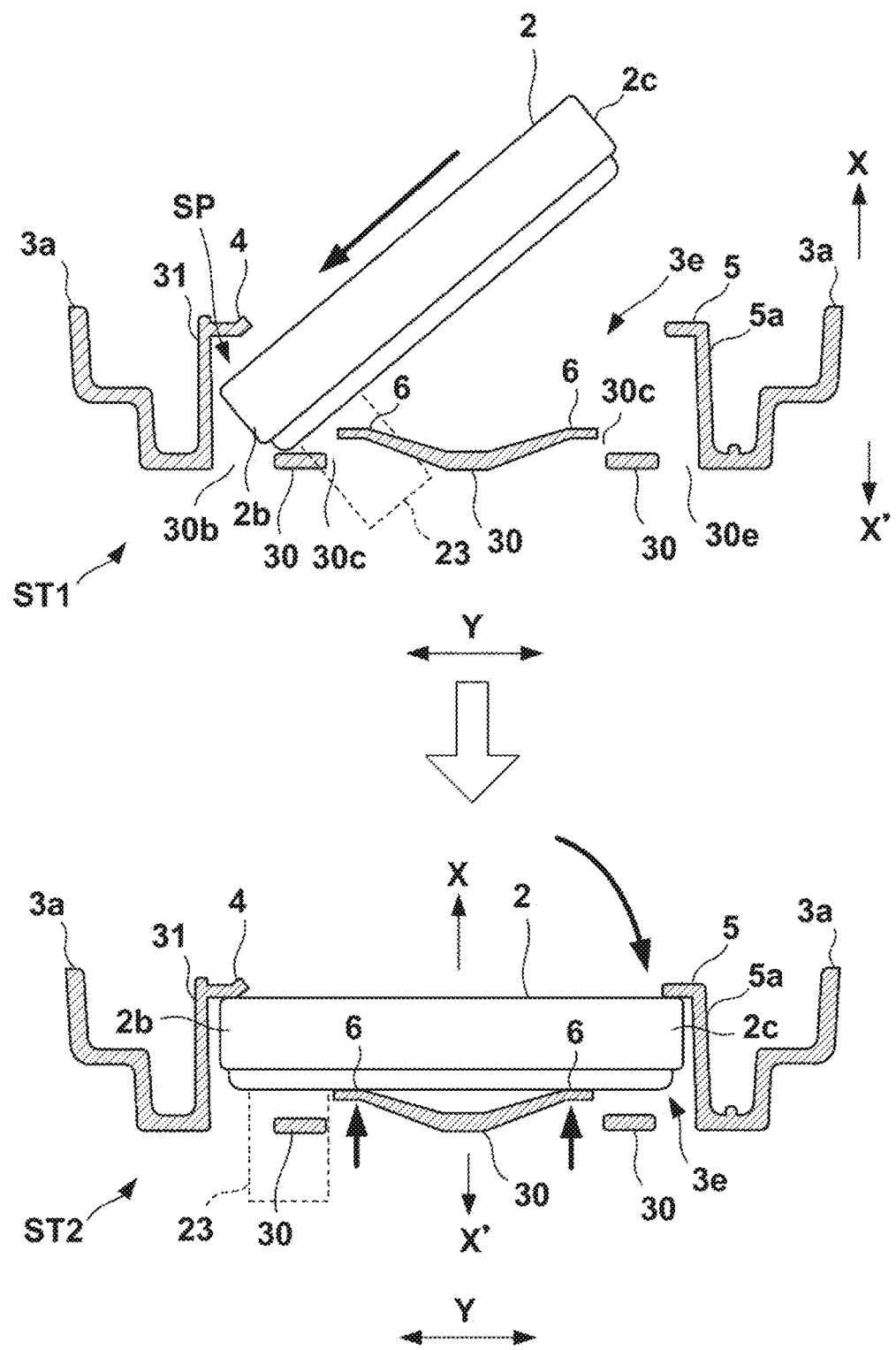
FIG. 5 is an explanatory view (a sectional view taken along a line A-A in FIG. 3) of an attachment method of the detection unit.

The method of attaching the detection unit 2 to the bracket 3 will be described with reference to FIG. 5. FIG. 5 is an explanatory view of the attachment method of the detection unit 2 and corresponds to a sectional view taken along a line A-A in FIG. 3. Each engaging portion 5 is formed integrally at the distal end of an arm portion 5a erected on the bottom wall portion 30. The arm portion 5a is formed in a position (the same position when viewed in the Y direction) which is on the same level as the side wall portion 33 in the Z direction and is elastically deformable in the Y direction.

In this embodiment, the detection unit 2 is attached to the bracket 3 by a pivotal attachment method. A state ST1 shown in FIG. 5 shows a state in which an end 2b of the detection unit 2 is inserted diagonally into the bottom wall portion 30. In a pivotal attachment structure according to this embodiment, the end 2b is inserted diagonally in a gap SP between the bottom wall portion 30 and the engaging portions 4. The end 2b is the end on the side of the side surface portion 22c in the Y direction. In this manner, the end 2b is inserted toward the side of the bottom wall portion 30 than the engaging portions 4. Note that the pivotal attachment structure according to this embodiment is merely an example, and another pivotal attachment structure following a scheme which the end 2b of the detection unit 2 is inserted diagonally toward the bottom wall portion 30 may be employed.

Subsequently, as shown in a state ST2, the detection unit 2 is pivoted about the side of the end 2b as the rotation center, and an end 2c is fitted inside the engaging portions 5. The end 2c is an end on the opposite side of the end 2b in the width direction (Y direction) of the detection unit 2. When the end 2c is to be inserted inside the engaging portions 5, a worker may use his/her fingers to temporarily displace the engaging portions 5 outside by the elastic deformation of the arm portion 5a.

Each pressing portion 6 is an inverted U-shaped elastic piece whose one end is integrally connected to the bottom wall portion 30 and whose other end is an open end. Four pressing portions 6 are arranged and function as springs that press the back surface portion 21 of the detection unit 2 in the X direction. As a result, the detection unit 2 is sandwiched between the pressing portions 6 and the engaging portions 4 and 5 and is positioned in the X direction by the engaging portions 4 and 5.

In this manner, the detection unit 2 can be pivotally attached to the bracket 3 according to this embodiment. This kind of pivotal attachment method allows the detection unit 2 to be attached to/detached from the bracket 3 even when another component of the vehicle 100 is present in the Y direction or the Z direction of the bracket 3. That is, the detection unit 2 can be attached/detached in a narrow space. Also, since the connector 23 is protruding from the back surface portion 21 of the detection unit 2 in this embodiment, it is difficult to adopt a method in which the detection unit 2 is attached to the bracket 3 by sliding the detection unit in the Y direction or the Z direction because the connector 23 will hinder this operation. Hence, the pivotal attachment method is advantageous in the point that it can cope with the arrangement of the connector 23 in this manner.

Figure 6:
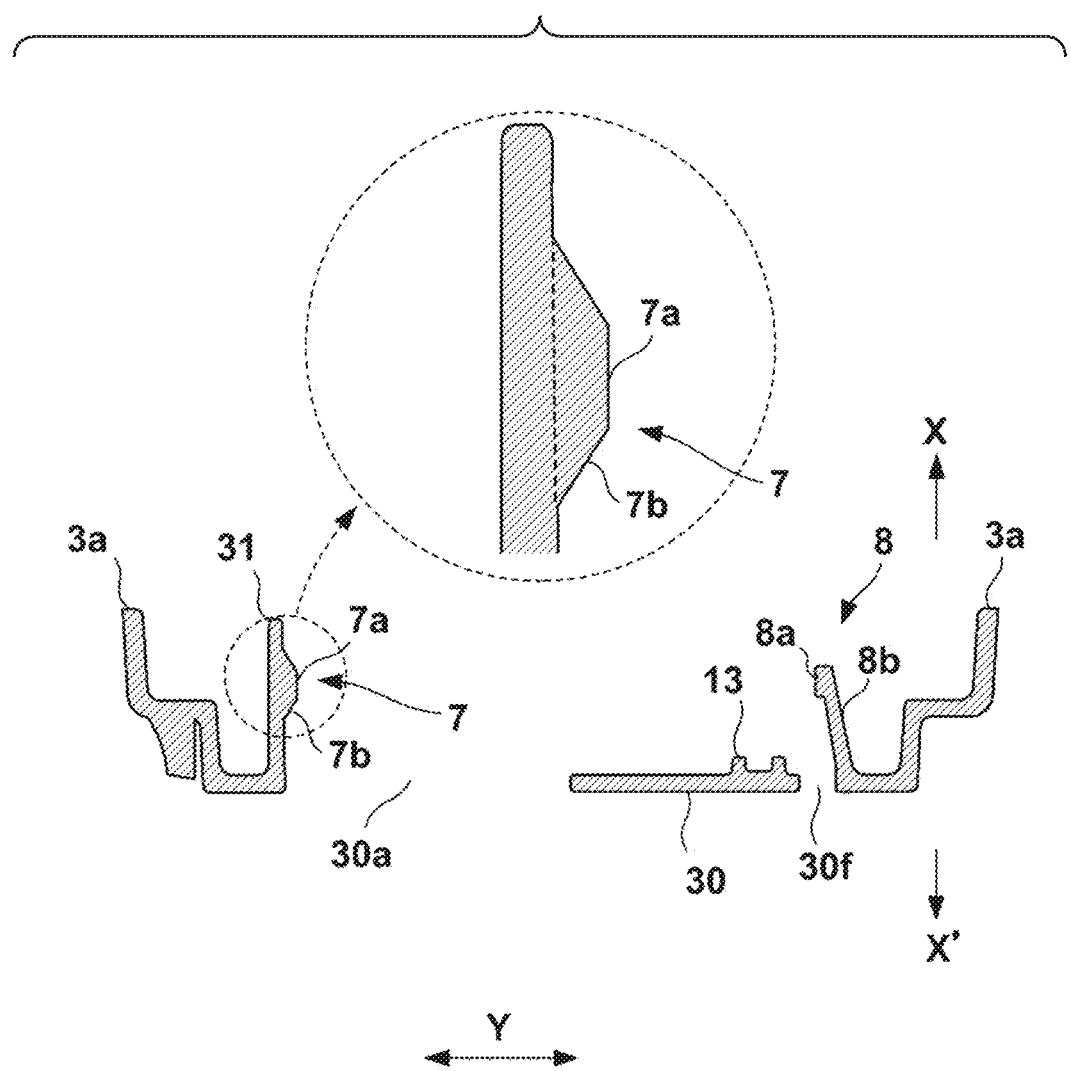
FIG. 6 is a sectional view taken along a line B-B in FIG. 3.
Figure 7:
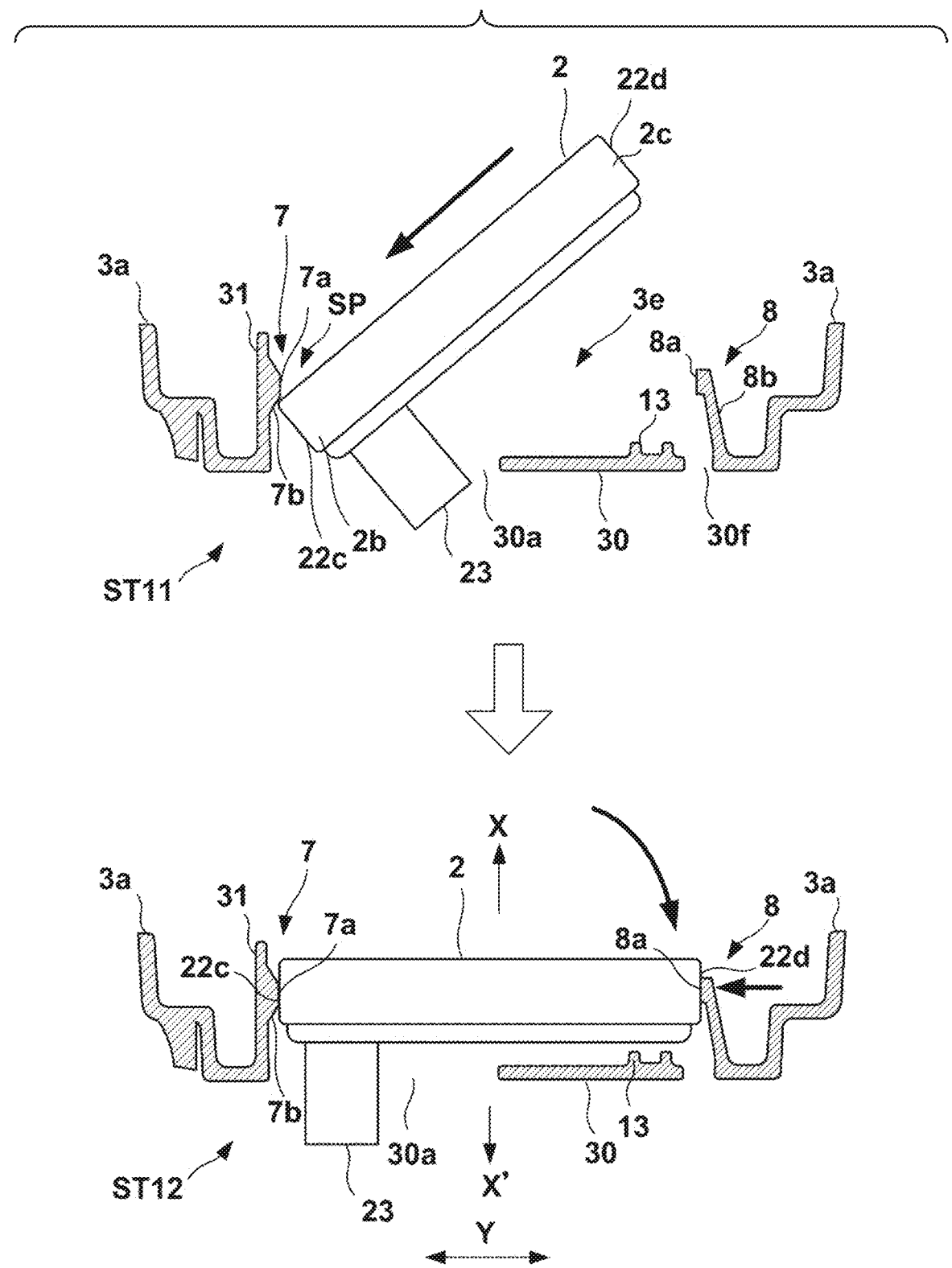
FIG. 7 is an explanatory view (a sectional view taken along the line B-B in FIG. 3) of an attachment guidance mode and a positioning mode of the detection unit.

In the pivotal attachment method, the attachment becomes unstable when the rotation center of the detection unit 2 shifts greatly. Also, the detection unit 2 needs to be positioned with respect to the bracket 3 in the Y direction. Hence, the guiding structure during pivoting and the Y direction positioning structure of the detection unit 2 will be described with reference to FIGS. 3, 6, and 7. FIG. 6 is a sectional view taken along a line B-B in FIG. 3. FIG. 7 is an explanatory view of an attachment guiding mode and a positioning mode of the detection unit 2 and corresponds to the sectional view taken along a line B-B in FIG. 3.

Two protruding portions 7, each of which is adjacent to the corresponding engaging portion 4, are formed on the side wall portion 31. Each of the two protruding portions 7 protrudes toward the side of the storage space 3e from the side surface of the side wall portion 31 in the Y direction. When viewed from the depth direction (the X direction or the X' direction) of the storage space 3e, each protruding portion 7 is positioned between the corresponding engaging portion 4 and the bottom wall portion 30.

Each protruding portion 7 is a plate-shaped protruding portion extending in the X direction, and its outer shape is a trapezoidal shape. A portion which corresponds to the upper base of the trapezoid forms a positioning portion 7a, and one of the portions corresponding to a leg of the trapezoid forms a guiding portion 7b. The positioning portion 7a is a surface parallel to the X-Z plane, and positions the detection unit 2 in the width direction (Y direction) by abutting against the side surface portion 22c of the detection unit 2. Positioning can be performed accurately even if the abutment area is small.

Each guiding portion 7b is continuously formed from the corresponding positioning portion 7a and is an inclined portion inclined and extended outward toward the bottom wall portion 30 in the Y direction. The guiding portion restricts the position of the end 2b in the Y direction and guides the end 2b to the positioning portion 7a by this inclination when the detection unit 2 is pivotally attached. Since the positioning portion 7a and the guiding portion 7b are in separate positions even though they are formed continuously, the positioning function of the positioning portion 7a will not be affected even if the guiding portion 7b is damaged.

FIG. 7 shows the guiding mode of the guiding portion 7b. A state ST11 shows a state similar to the state ST1 of FIG. 5, and is a state in which the end 2b of the detection unit 2 is to be inserted diagonally to the gap SP between the bottom wall portion 30 and the engaging portions 4. The worker can smoothly insert the end 2b to the gap SP because the guiding portion 7b has an inclination near the insertion direction of the end 2b.

A state ST12 shows a state similar to the state ST2 of FIG. 5, and shows a state in which the end 2c has been fitted inside the engaging portion 5 by pivoting the detection unit 2 about the side of the end 2b as the center. The presence of the guiding portion 7b restricts the displacement of the end 2b in the Y direction, and the detection unit 2 can pivot more smoothly. As the pivoting of the detection unit 2 proceeds, each corner of the end 2b slides along the corresponding guiding portion 7b so as to climb the guiding portion 7b, the end 2b is guided to each positioning portion 7a, and the side surface portion 22c abuts against each positioning portion 7a in the Y direction. By setting the guiding portion 7b to be an inclined surface, the end 2b can slide along the guiding portion 7b easily and the end 2b will be more resistant to damage when the detection unit 2 is pivoted.

In this manner, when pivotal attachment is performed in this embodiment, the end 2b can be guided from each guiding portion 7b to the corresponding positioning portion 7a, and the pivotal attachment of the detection unit 2 can be performed smoothly and stably. Note that although the guiding portion 7b is formed as a flat inclined surface, the guiding portion may be formed as a curved inclined surface. Also, although the positioning portion 7a and the guiding portion 7b may be formed by separate members or on separate parts, the detection unit can be guided smoothly as described above by forming the positioning portion and the guiding portion continuously in the manner according to this embodiment.

Each pressing portion 8 is an elastic piece which integrally includes an arm portion 8b erected on the bottom wall portion 30 and an abutment portion 8a formed on the opening-end side of the arm portion 8b. The arm portion 8b is formed in a position (the same position when viewed in the Y direction) which is on the same level as the side wall portion 33 in the Z direction and is elastically deformable in the Y direction. The abutment portion 8a abuts against the side surface portion 22d of the detection unit 2, and each pressing portion 8 presses the detection unit 2 to the side of the positioning portion 7a in the Y direction. As a result, the detection unit 2 is held between each protruding portion 7 and each pressing portion 8 and positioned in the Y direction by each positioning portion 7a.

Figure 8:
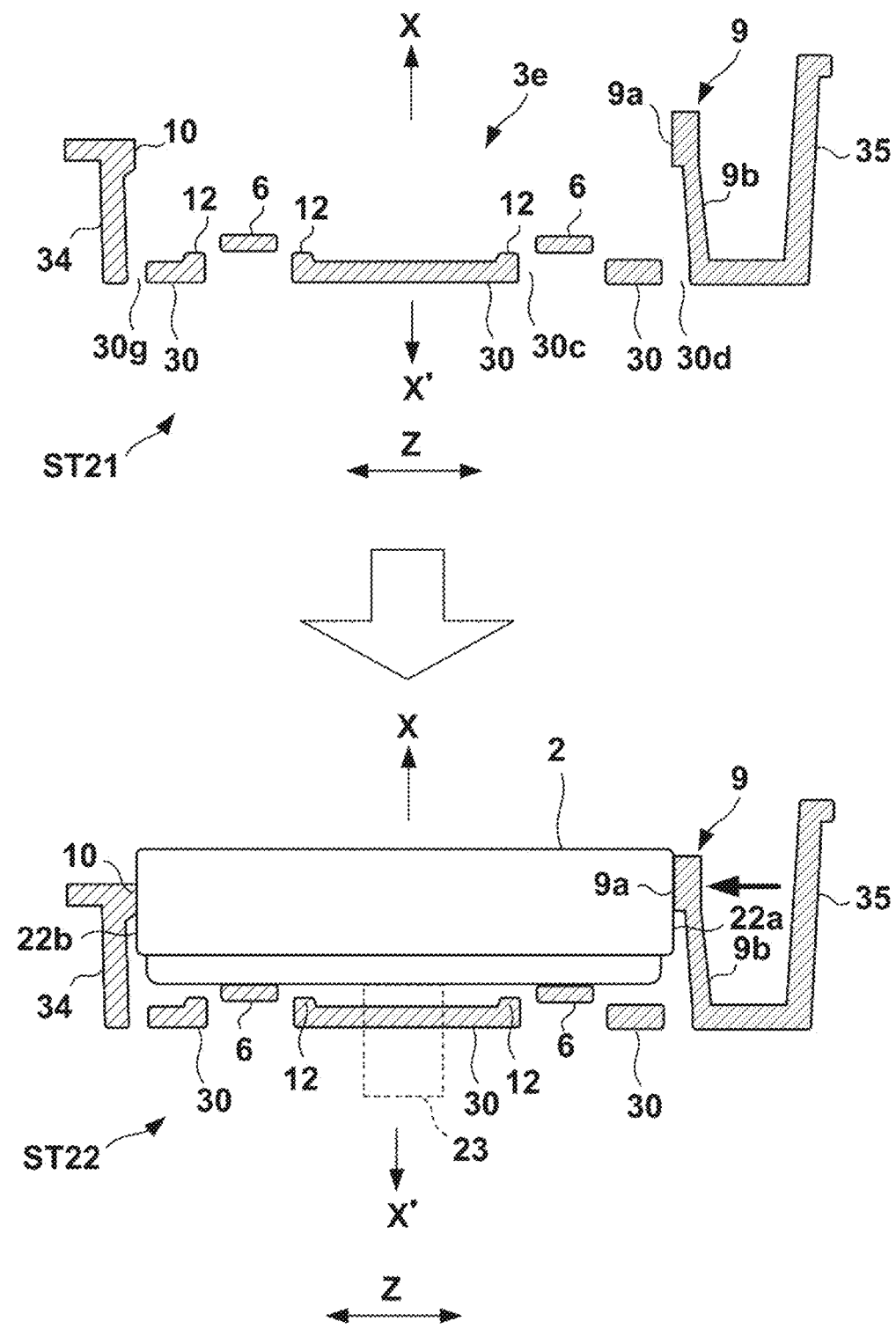
FIG. 8 is an explanatory view (a sectional view taken along a line C-C in FIG. 3) of the positioning mode of the detection unit.

The structure for positioning the detection unit 2 in the Z direction will be described next with reference to FIGS. 3 and 8. FIG. 8 is an explanatory view of the positioning mode of the detection unit 2 and corresponds to a sectional view taken along a line C-C in FIG. 3. A state ST21 shows a state in which the detection unit 2 has not been attached, and a state ST22 shows a state in which the detection unit 2 has been attached.

On the side wall portion 34, three positioning portions 10 are formed spaced apart from each other in the Y direction. Each positioning portion 10 protrudes toward the inner side of the storage space 3e from the side wall portion 34 in the Z direction. The end surface of each positioning portion 10 is a surface parallel to the X-Y plane, and abuts against the side surface portion 22b of the detection unit 2 to position the detection unit 2 in the width direction (Z direction).

Two pressing portions 9 are formed spaced apart from each other in the Y direction. Each pressing portion 9 is an elastic piece which integrally includes an arm portion 9b erected on the bottom wall portion 30 and an arm portion 9a formed on the open-end side of the arm portion 9b. The arm portion 9b is formed in a position (the same position when viewed in the Z direction) which is on the same level as the side wall portion 32 in the Y direction and is elastically deformable in the Z direction. The detection unit 2 is positioned between each positioning portion 10 and each pressing portion 9 by temporarily deforming the arm portion 9b toward the outer side (upper side) in the Z direction. The arm portion 9a abuts against the side surface portion 22a of the detection unit 2 in the Z direction, thereby causing the pressing portion 9 to press the detection unit 2 to the side of the positioning portions 10 in the Z direction. As a result, the detection unit 2 is sandwiched between the positioning portions 10 and the pressing portions 9 and is positioned in the Z direction by the positioning portions 10.

<Coping with Shifts at Attachment>

The insertion direction and the insertion position of the end 2b will shift somewhat in some cases. A guiding structure that guides the detection unit 2 to an appropriate position has been provided in the bracket 3 to cope with such shifts.

Figure 9:
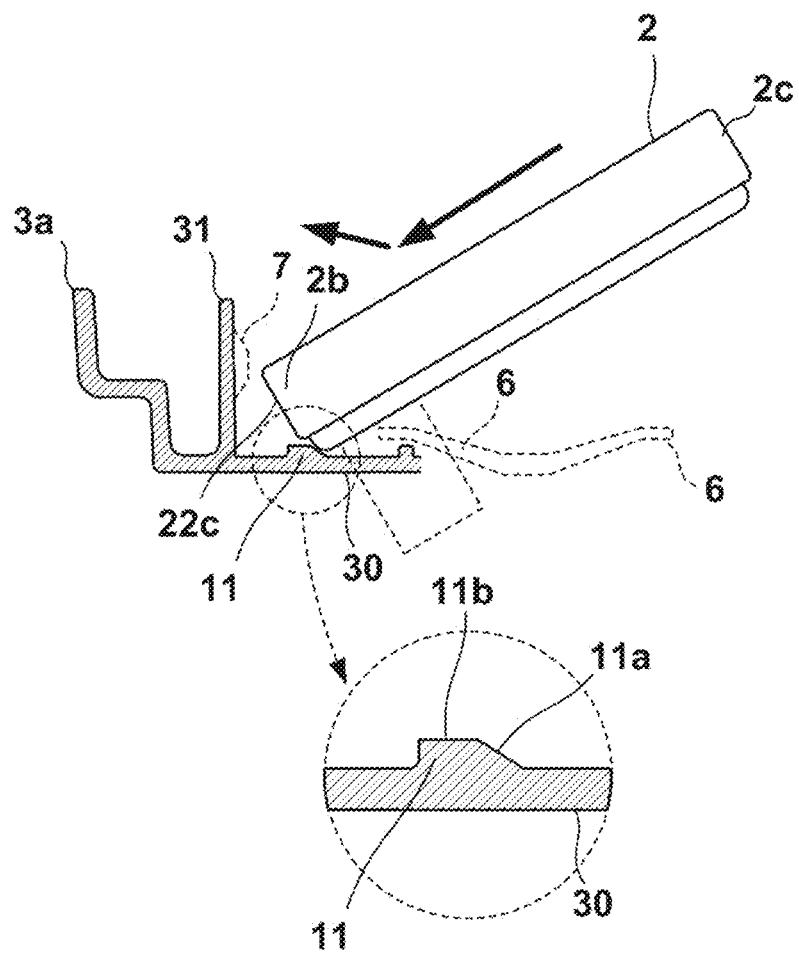
FIG. 9 is an explanatory view (a sectional view taken along a line D-D in FIG. 3) of the attachment guidance mode of the detection unit.

FIG. 9 is a sectional view taken along a line D-D in FIG. 3 and shows a guiding portion 11 provided on the bottom wall portion 30. The guiding portion 11 is formed on each of the two sides of the hole 30a in the Z direction and is a plate-like protruding portion protruding from the bottom wall portion 30 in the X direction. Each guiding portion 11 includes an inclined surface 11a and a flat surface 11b that have been formed continuously. The flat surface 11b is a surface parallel to the Y-Z plane, and the inclined surface 11a is a surface inclined with respect to the Y-Z plane. The inclined surface 11a is positioned closer to the side of the side wall portion 33 than the flat surface 11b in the Y direction, and is inclined toward the side of the side wall portion 31 in the X direction.

As shown in FIG. 9, each corner of the end 2b abuts against the corresponding inclined surface 11a if the end 2b is inserted a little short of the protruding portion 7 or is inserted at a comparatively shallow angle with respect to the bottom wall portion 30 when the detection unit 2 is to be attached. The detection unit 2 can be guided so that the end 2b can climb up the inclined surface 11a to the flat surface 11b and bring the end 2b closer to the protruding portions 7.

Figure 10:
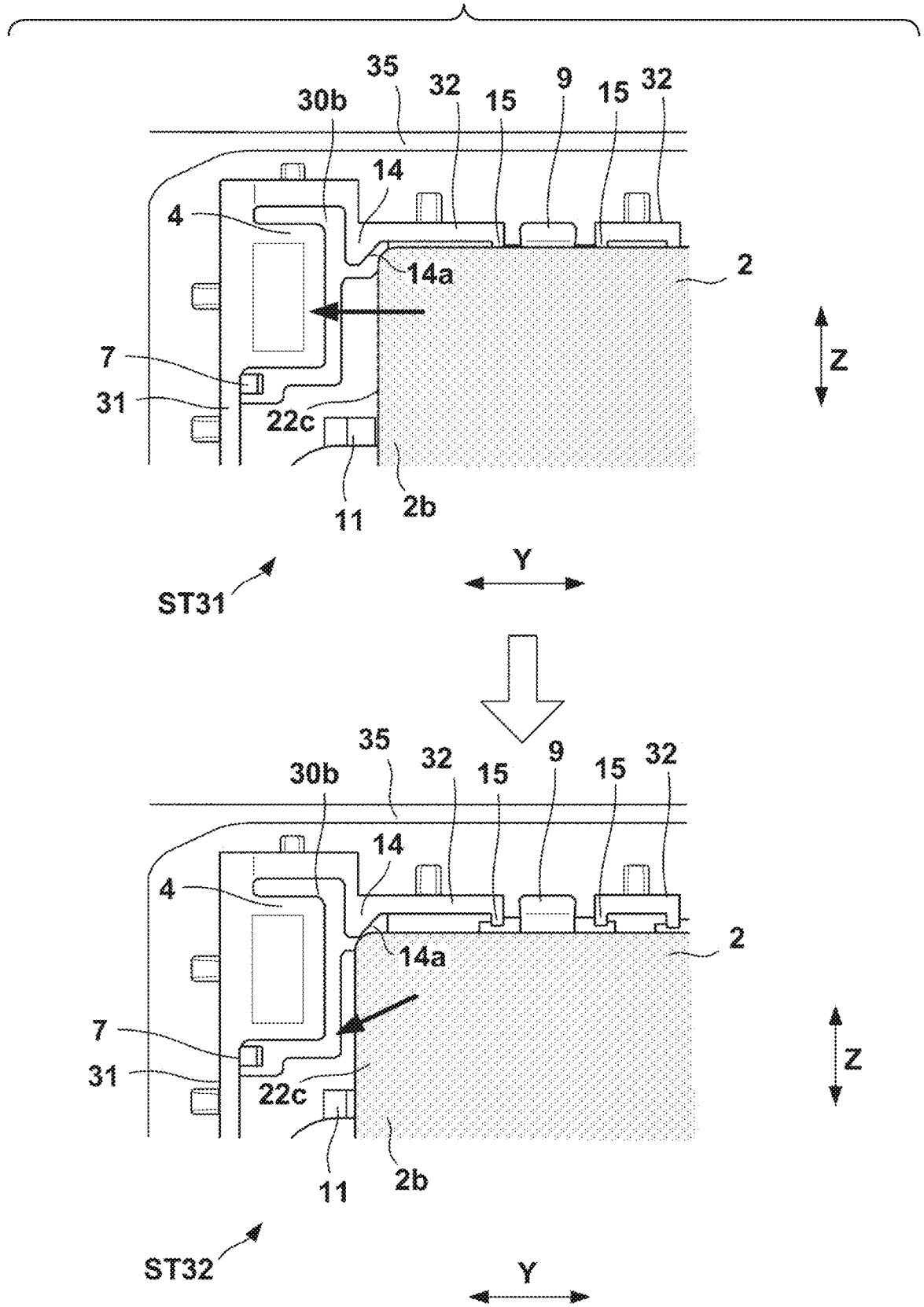
FIG. 10 is an explanatory view of the attachment guidance mode of the detection unit.

FIG. 10 shows a guiding portion 14 provided on the side wall portion 32. While the guiding portion 11 is a portion that guides the detection unit 2 in the X direction, the guiding portion 14 guides the detection unit 2 in the Z direction. The guiding portion 14 is a plate-like protruding portion protruding from the side wall portion 32 to the inner side of the storage space 3e in the Z direction. The guiding portion 14 includes an inclined surface 14a, and the inclined surface 14a inclines, from the outer side of the storage space 3e to the inner side, towards the side of the of the side wall portion 31.

A state ST31 shows a state in which the detection unit 2 is being attached, and the Z-direction position of the detection unit 2 is biased toward the side of the side wall portion 32 than toward the correct position. When the end 2b of the detection unit 2 is to be inserted into the gap SP as shown in the state ST1 of FIG. 5 and in the state ST11 of FIG. 7, each corner of the end 2b abuts against the inclined surface 14a and is guided toward the center in the Z direction as shown in a state ST32 of FIG. 10. As a result, the detection unit 2 can be guided to the correct position in the Z direction during the attachment process.

<Prevention of Plastic Deformation of Elastic Piece>

The pressing portions 6, 8, and 9 position the detection unit 2 by pressing the engaging portions 4 and 5, the positioning portions 7a, and the positioning portions 10, respectively, by their elastic force. The pressing portions 6, 8, and 9 may be pressed excessively in some cases when the detection unit 2 is being attached. Alternatively, depending on the driving state of the vehicle 100, a force of inertia that biases the pressing portions 6, 8, and 9 in the opposite direction may act on the detection unit 2. In this case, if the pressing portions 6, 8, and 9 exceed the limit of elastic deformation and are plastically deformed, the pressing force applied subsequently on the detection unit 2 will be reduced or lost, thereby degrading the positioning performance of the detection unit 2. Hence, stoppers 12, 13, 15, and 16 are provided to restrict the displacement of the detection unit 2 before the pressing portions 6, 8, and 9 exceed the limit of elastic deformation and are plastically deformed.

The stoppers 12 and 13 are shown in FIG. 3 and FIGS. 6 to 8. Each of the stoppers 12 and 13 is a protruding portion that protrudes from the bottom wall portion 30 in the X direction. The plurality of stoppers 12 are formed adjacent to the holes 30c, and one stopper 13 is formed as a ring-shaped protruding portion. Although the height of the protrusion of each of these stoppers 12 and 13 is set to be a height which will not make the stoppers abut against the back surface portion 21 of the detection unit 2 in a state in which the detection unit 2 is positioned and abutted against the engaging portions 4 and 5 by the biasing of the pressing portions 6, the height of the protrusion of each stopper is set to be a height which will make the stopper abut against the back surface portion 21 before the pressing portions 6 will reach the limit of elastic deformation. That is, although the detection unit 2 will not abut against the stoppers 12 and 13 in a normal state, the displacement of the detection unit 2 will be restricted by the stoppers 12 and 13 before the pressing portions 6 reaches the limit of elastic deformation when a force of inertia that will greatly displace the detection unit 2 to the side of the bottom wall portion 30 is applied. The guiding portions 11 described above also function as stoppers similar to the stoppers 12 and 13.

The stoppers 15 are shown in FIGS. 3, 4, and 10. Each stopper 15 is a protruding portion that protrudes from the side wall portion 32 to the inner side of the storage space 3e in the Z direction, and a plurality of the stoppers 15 are formed spaced apart from each other in the Y direction. Although the height of the protrusion of each stopper 15 is set to be a height which will not make the stoppers abut against the side surface portion 22a of the detection unit 2 in a state in which the detection unit 2 is positioned and abutted against the positioning portion 10 by the biasing of the pressing portions 9, the height of the protrusion of each stopper is set to be a height which will make the stopper abut against the side surface portion 22a before the pressing portions 9 will reach the limit of elastic deformation. The guiding portion 14 described above also functions as a stopper similar to the stoppers 15.

The stoppers 16 are shown in FIGS. 3 and 4. Each stopper 16 is a protruding portion that protrudes from the side wall portion 33 to the inner side of the storage space 3e in the Y direction, and a plurality of the stoppers 16 are formed apart from each other in the Z direction. Although the height of the protrusion of each stopper 16 is set to be a height which will not make the stoppers abut against the side surface portion 22d of the detection unit 2 in a state in which the detection unit 2 is positioned and abutted against the positioning portions 7a by the biasing of the pressing portions 8, the height of the protrusion of each stopper is set to be a height which will make the stopper abut against the side surface portion 22d before the pressing portions 8 will reach the limit of elastic deformation.

<Removal of Detection Unit>

Figure 11:
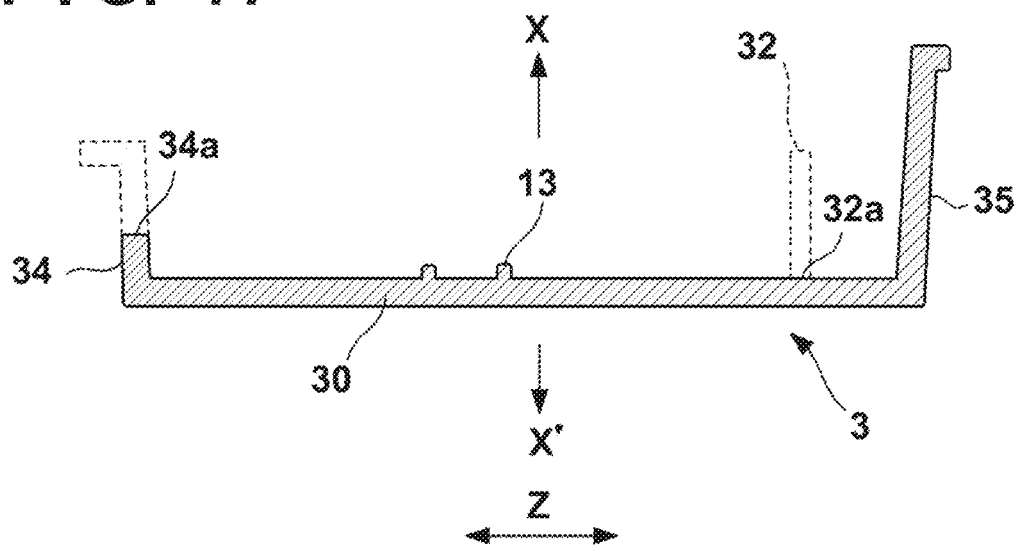
FIG. 11 is a sectional view taken along a line E-E in FIG. 3.

Since the detection unit 2 is surrounded by the side wall portions 31 to 34 in a state in which the detection unit is attached to the bracket 3, it may be difficult for the worker to grasp the detection unit 2 at the time of removal in some cases. In this embodiment, as shown in FIGS. 3 and 11, an opening portion 32a and an opening portion 34a are arranged on the side wall portion 32 and the side wall portion 34, respectively, so that the respective side surface portions of the detection unit 2 will be partially exposed to make the detection unit easier to grasp. FIG. 11 is a sectional view taken along a line E-E in FIG. 3.

The opening portion 32a and the opening portion 34a are formed at positions that face each other in the Z direction. In the case of this embodiment, the opening portion 32a is a recessed portion which is recessed from the distal end of the side wall portion 32 to the side of the bottom wall portion 30. In the case of this embodiment, the opening portion 34a is also a recessed portion which is recessed from the distal end of the side wall portion 34 to the side of the bottom wall portion 30.

In the case of this embodiment, the recessed portion of the opening portion 32a and the recessed portion of the opening portion 34a have different depths (the depth of the recess in the X' direction) from each other. The opening portion 32a reaches up to the surface of the bottom wall portion 30 and is a deep recess with substantially no side wall portion 32. On the other hand, differing from the opening portion 32a, the opening portion 34a has a shallow recess since the bottom surface of the opening portion 34a is at a position higher than the surface of the bottom wall portion 30. That is, the side wall portion 34 remains in the opening portion 34a. In the case of this embodiment, as described above, the side of the side wall portion 32 has a double-wall structure in which the wall portion 35 is present outside, and the reinforcement by the wall portion 35 allows the rigidity of the side wall portion 32 to be set lower than that of the side wall portion 34 in this structure. Hence, the opening portion 32a can be formed largely so it will be easier for the worker to insert his/her fingertips. On the other hand, since the side of the side wall portion 34 has a single-wall structure, the side wall portion 34 is made to remain at a low height in the opening portion 34a to maintain the rigidity of the side wall portion 34.

Figure 12:
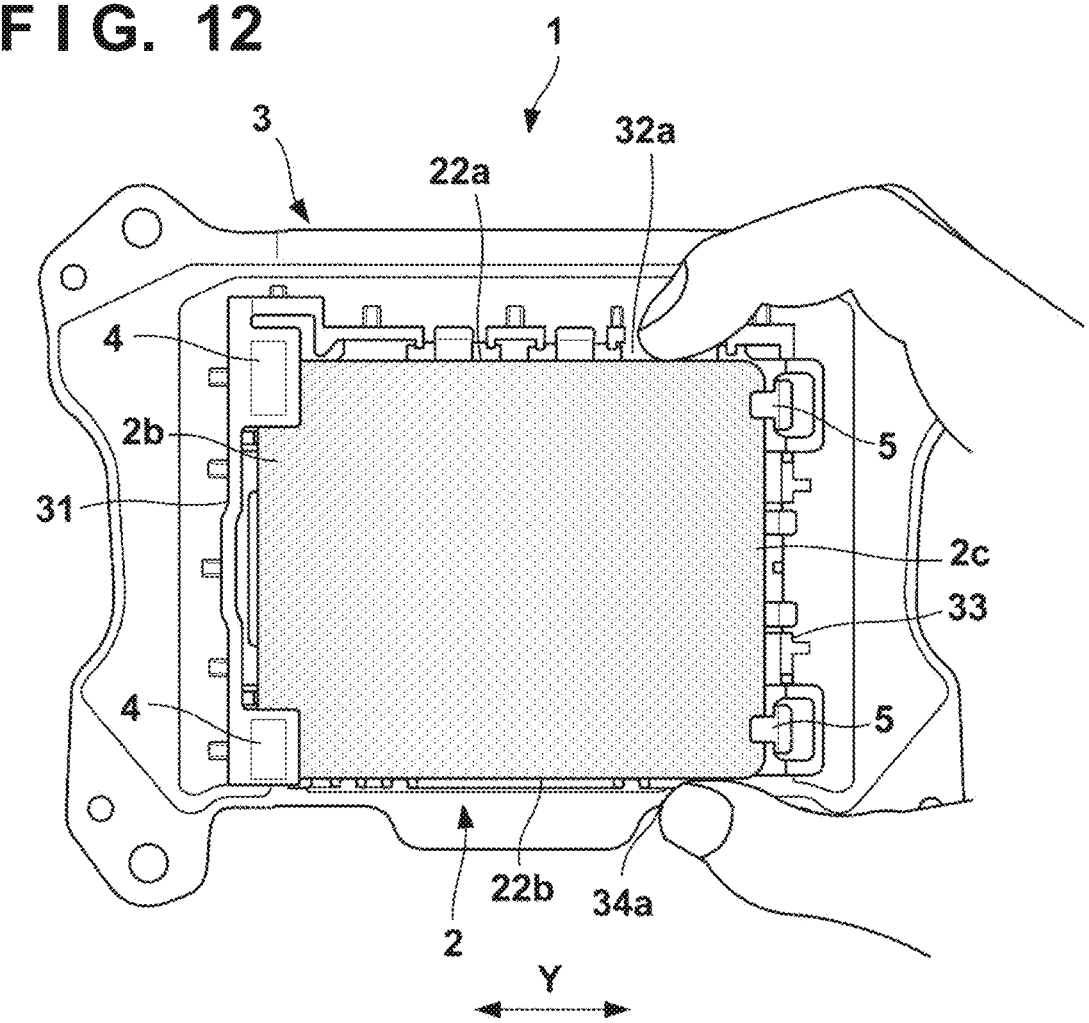
FIG. 12 is an explanatory view for a removal mode of the detection unit.

FIG. 12 shows an example of a mode of grasping the detection unit 2 when the detection unit 2 is to be removed from the bracket 3. The two fingers of the worker are in contact with the side surface portions 22a and 22b of the detection unit 2 which are exposed from the opening portions 32a and 34a, respectively, and grasp the detection unit 2. The detection unit 2 can be removed by pivoting the detection unit 2 in a direction opposite to that at the time of the attachment. That is, the side of the end 2c of the detection unit 2 is pulled out from the bracket 3 in the X direction and pivoted in reverse about the end 2b as the center. Since the opening portions 32a and 34a are positioned closer to the side of the side wall portion 33 than the side wall portion 31, it is easier for the worker to grasp the side of the end 2c of the detection unit 2. The worker can pull the side of the end 2c in the X direction to release the lock by the engaging portions 5 and diagonally pull out the detection unit 2. The worker can temporarily displace the engaging portions 5 to the outer side when releasing the lock of the engaging portions 5.

In this manner, according to this embodiment, the removal of the detection unit 2 can be simplified. Note that although each of the opening portions 32a and 34a is set as a notch-like recessed portion in the case of this embodiment, at least one of the opening portions may be arranged as a closed hole around it. However, setting the opening portions 32a and 34a as recessed portions can further simplify the removal of the detection unit 2 because no walls will be present in the direction in which the detection unit 2 will be removed.

Summary of Embodiment

The embodiment described above at least discloses the following detection apparatus.

A1. The detection apparatus (for example, 1) according to the above-described embodiment is a detection apparatus that includes a detection unit (for example, 2) configured to detect a peripheral environment of a vehicle (for example, 100) and a bracket (for example, 3) configured to attach the detection unit to a vehicle body, wherein the detection unit includes a bottom wall portion (for example, 30) and side wall portions (for example, 31-34) configured to surround a storage space (for example, 3e) for storing the detection unit, and the side wall portions include a first side wall portion (for example, 32), and a second side wall portion (for example, 34) facing the first side wall portion, and the detection unit is attached to the bracket by inserting an end (for example 2b) of the detection unit diagonally toward the bottom wall portion and pivoting the detection unit about the side of the end as a center, the first wall portion includes a first opening portion (for example, 32*a*) which exposes the detection unit, and the second wall portion includes, in a position facing the first opening portion, a second opening portion (for example, 34*a*) which exposes the detection unit.

According to this embodiment, the removal of the detection unit can be simplified by allowing the worker to pinch the detection unit more easily through the opening.

A2. In the detection apparatus according to the embodiment described above, the first opening portion is a first recessed portion which is recessed from the distal end of the first side wall portion toward the side of the bottom wall portion, and the second opening portion is a second recessed portion which is recessed from the distal end of the second side wall portion toward the bottom wall portion.

According to this embodiment, setting the opening portions as recessed portions can simplify the removal of the detection unit because no walls will be present in the direction in which the detection unit will be removed.

A3. In the detection apparatus according to the embodiment described above, the bracket includes a reinforcing wall portion (for example, 35) arranged closer to the outer side than the side wall portions when viewed from the storage space so as to be spaced apart from the side wall portions.

According to this embodiment, the removal of the detection unit can be simplified while ensuring the rigidity of the bracket.

A4. In the detection apparatus according to the embodiment described above, the bracket includes a reinforcing wall portion (for example, 35) arranged closer to the outer side than the first recessed portion when viewed from the storage space so as to be spaced apart from the first side wall portion, and the depth of the second recessed portion is shallower than the first recessed portion.

According to this embodiment, the removal of the detection unit can be simplified while ensuring the rigidity of the bracket.

A5. In the detection apparatus according to the embodiment described above, the side wall portions include a third side wall portion (for example, 31) between the first side wall portion and the second side wall portion, and a fourth side wall portion (for example, 33) facing the third side wall portion, and the end of the detection unit is positioned on the side of the third side wall portion, and the first opening portion and the second opening portion are positioned closer to the side of the fourth side wall portion than the third side wall portion.

According to this embodiment, a pivoting method can be employed to simplify the removal of the detection unit.

A6. In the detection apparatus according to the embodiment described above, the side wall portions include a third side wall portion (for example, 31) between the first side wall portion and the second side wall portion, and the bracket includes a first engaging portion (for example, 4) arranged to protrude from the third side wall portion toward the side of the storage space and configured to hold the end of the detection unit by sandwiching the end of the detection unit with the bottom wall portion, and the detection unit is attached to the bracket by inserting the end between the bottom wall portion and the first engaging portion and pivoting the detection unit about the side of the one end as the center.

According to this embodiment, the detection unit can be attached simply by employing the pivoting method.

A7. In the detection apparatus according to the embodiment described above, the bracket includes a first engaging portion (for example, 4) arranged to protrude from the third wall portion toward the side of the storage space and configured to hold the end of the detection unit by sandwiching the end of the detection unit with the bottom wall portion, and a second engaging portion (for example, 5) arranged on the side of the fourth side wall portion and configured to hold the other end (for example, 2*c*) of the detection unit by sandwiching the other end of the detection unit with the bottom wall portion, and the detection unit is attached to the bracket by diagonally inserting the end between the bottom wall portion and the first engaging portion and pivoting the detection unit about the side of the end as the center.

According to this embodiment, the detection unit can be attached/detached simply by employing the pivoting method.

B1. The detection apparatus (for example, 1) according to the embodiment described above is a detection apparatus that includes a detection unit (for example, 2) configured to detect a peripheral environment of a vehicle (for example, 100) and a bracket (for example, 3) configured to attach the detection unit to a vehicle body, wherein the detection unit includes a front surface portion (for example, 20) including an exposed portion exposed from the bracket in a detection direction (for example, X) of the detection unit, a back surface portion (for example, 21) on a side opposite to the front surface portion in thickness directions, (for example, X and X') of the detection unit, and side surface portions (for example, 22*a*-22*d*) between the front surface portion and the back surface portion, and the bracket includes a bottom wall portion (for example, 30) facing the back surface portion, and a first guiding portion (for example, 7*b*) configured to guide the attachment of the detection unit to the bracket, and when the detection unit is attached to the bracket by diagonally inserting one end (for example, 2*b*) of the detection unit towards the bottom wall portion and pivoting the detection unit about a side of the one end as a rotation center, the first guiding portion restricts a position of the one end.

According to this embodiment, a structure that allows the detection unit to be pivotally attached to the detection unit to the bracket can be provided, and smoother pivoting can be implemented particularly by the first guiding portion.

B2. In the detection apparatus according to the embodiment described above, the bracket includes a positioning portion (for example, 7*a*) configured to restrict the displacement of the detection unit in a width direction by abutting against the side surface portion (for example, 22*c*) on the side of the one end of the detection unit, and the first guiding portion is configured to restrict the position of the one end in the width direction and guide the one end to the positioning portion, when the detection unit is attached to the bracket by diagonally inserting the one end of the detection unit towards the bottom wall portion and pivoting the detection unit about the side of the one end as the rotation center.

According to this embodiment, the first guiding portion can guide the end to the positioning portion when the detection unit is to be pivotally attached to the detection unit to the bracket.

B3. In the detection apparatus according to the embodiment described above, the first guiding portion is an inclined portion extending outward toward the bottom wall portion of the bracket in a width direction of the detection unit.

According to this embodiment, smoother pivoting can be implemented when the detection unit is to be pivotally attached to the bracket.

B4. In the detection apparatus according to the embodiment described above, the bottom wall portion includes a second guiding portion (for example, 11) configured to abut against the end and guide the side surface portion to the positioning portion in the thickness direction when the end of the detection unit is inserted diagonally toward the bottom wall portion.

According to this embodiment, the detection unit can be guided more smoothly to the positioning portion even if the position or the angle has shifted at the attachment of the detection unit.

B5. In the detection apparatus according to the embodiment described above, the bracket includes a side wall portion (for example, 31) configured to face the side surface portion, and a protruding portion (for example, 7) configured to protrude from the side wall portion to the side of the detection unit, and the protruding portion includes the first guiding portion and the positioning portion.

According to this embodiment, the protruding portion can both guide the pivoting and positioning of the detection unit.

B6. In the detection apparatus according to the embodiment described above, an outer shape of the protruding portion is a trapezoid, the first guiding portion corresponds to a leg of the trapezoid, and the positioning portion corresponds to an upper base of the trapezoid.

According to this embodiment, the end can be guided smoothly to the positioning portion because the first guiding portion and the positioning portion are continuous, and positioning by the positioning portion will not be influenced even if the first guiding portion is damaged because the first guiding portion and the positioning portion are formed in separate parts. Furthermore, the abutment area of the detection unit and the positioning unit may be small, and positioning can be performed accurately.

B7. In the detection apparatus according to the embodiment described above, the bracket includes a first engaging portion (for example, 4) configured to abut against the front surface portion on the side of the one end in the width direction of the detection unit and hold the detection unit by sandwiching the detection unit with the bottom wall portion, and when the detection unit is attached to the bracket by diagonally inserting the one end between the bottom wall portion and the first engaging portion and pivoting the detection unit about the side of the one end as the rotation center, the first guiding portion restricts the position of the one end.

According to this embodiment, smoother pivoting can be implemented by the first guiding portion while improving the holding performance of the detection unit.

B8. In the detection apparatus according to the embodiment described above, the bracket includes a second engaging portion (for example, 5) configured to abut against the front surface portion on the side of the other end (for example, 2c) of the detection unit in a width direction of the detection unit and hold the other end of the detection unit by sandwiching the other end of the detection unit with the bottom wall portion.

According to this embodiment, the holding performance of the detection unit can be improved easily.

B9. The detection apparatus (for example, 1) according to the embodiment described above is a detection apparatus that includes a detection unit (for example, 2) configured to detect a peripheral environment of a vehicle (for example, 100) and a bracket (for example, 3) configured to attach the detection unit to a vehicle body, wherein the bracket includes a bottom wall portion (for example, 30) and side wall portions (for example, 31-34) configured to surround a storage space (for example, 3e) for storing the detection unit, a engaging portion (for example, 4) arranged to protrude from a side wall portion (for example, 31) to the side of the storage space and configured to hold one end (for example, 2b) of the detection unit by sandwiching the one end of the detection unit with the bottom wall portion, and a protruding portion (for example, 7) arranged closer to the side of the bottom wall portion than the engaging portion in depth directions (for example, X, X') of the storage space and configured to protrude from the side wall portion to an inner side of the storage space, and the protruding portion includes a positioning portion (for example, 7a) configured to abut against a side surface portion (for example, 22c) of the detection unit on a side of the one end to restrict displacement of the detection unit in a width direction (for example, Y), and an inclined portion (for example, 7b) configured to extend from the positioning unit to the bottom wall portion with being inclined toward an outer side of the storage space.

According to this embodiment, a structure that allows the detection unit to be pivotally attached to the detection unit to the bracket can be provided, and in particular, the protruding portion can guide the pivoting and perform positioning of the detection unit.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

What is claimed is:

1. A detection apparatus comprising a detection unit configured to detect a peripheral environment of a vehicle and a bracket configured to attach the detection unit to a vehicle body, wherein the detection unit includes a front surface portion including an exposed portion exposed from the bracket in a detection direction of the detection unit, a back surface portion on a side opposite to the front surface portion in a thickness direction of the detection unit, and
side surface portions between the front surface portion and the back surface portion, and
the bracket includes
a bottom wall portion facing the back surface portion, and
a first guiding portion configured to guide the attachment of the detection unit to the bracket, and
when the detection unit is attached to the bracket by diagonally inserting one end of the detection unit towards the bottom wall portion and pivoting the detection unit about a side of the one end as a rotation center, the first guiding portion restricts a position of the one end,
the bracket includes a positioning portion configured to restrict displacement of the detection unit in a width direction by abutting against the side surface portion on the side of the one end of the detection unit, and
the first guiding portion is configured to restrict the position of the one end in the width direction and guide the one end to the positioning portion, when the detection unit is attached to the bracket by diagonally inserting the one end of the detection unit towards the bottom wall portion and pivoting the detection unit about the side of the one end as the rotation center, and
the bottom wall portion includes a second guiding portion configured to abut against the end and guide the side surface portion to the positioning portion in the thickness direction when the end of the detection unit is inserted diagonally toward the bottom wall portion.

2. A detection apparatus comprising a detection unit configured to detect a peripheral environment of a vehicle and a bracket configured to attach the detection unit to a vehicle body,
wherein the detection unit includes
a front surface portion including an exposed portion exposed from the bracket in a detection direction of the detection unit,
a back surface portion on a side opposite to the front surface portion in a thickness direction of the detection unit, and
side surface portions between the front surface portion and the back surface portion, and
the bracket includes
a bottom wall portion facing the back surface portion, and
a first guiding portion configured to guide the attachment of the detection unit to the bracket, and
when the detection unit is attached to the bracket by diagonally inserting one end of the detection unit towards the bottom wall portion and pivoting the detection unit about a side of the one end as a rotation center, the first guiding portion restricts a position of the one end,
the bracket includes a positioning portion configured to restrict displacement of the detection unit in a width direction by abutting against the side surface portion on the side of the one end of the detection unit, and
the first guiding portion is configured to restrict the position of the one end in the width direction and guide the one end to the positioning portion, when the detection unit is attached to the bracket by diagonally inserting the one end of the detection unit towards the bottom wall portion and pivoting the detection unit about the side of the one end as the rotation center,
the bracket includes
side wall portions configured to face the side surface portions, and
a protruding portion configured to protrude from each side wall portion to the side of the detection unit, and
the protruding portion includes the first guiding portion and the positioning portion.

3. The apparatus according to claim 2, wherein an outer shape of the protruding portion is a trapezoid,
the first guiding portion corresponds to a leg of the trapezoid, and
the positioning portion corresponds to an upper base of the trapezoid.

4. A detection apparatus comprising a detection unit configured to detect a peripheral environment of a vehicle and a bracket configured to attach the detection unit to a vehicle body,
wherein the detection unit includes
a front surface portion including an exposed portion exposed from the bracket in a detection direction of the detection unit,
a back surface portion on a side opposite to the front surface portion in a thickness direction of the detection unit, and
side surface portions between the front surface portion and the back surface portion, and
the bracket includes
a bottom wall portion facing the back surface portion, and
a first guiding portion configured to guide the attachment of the detection unit to the bracket, and
when the detection unit is attached to the bracket by diagonally inserting one end of the detection unit towards the bottom wall portion and pivoting the detection unit about a side of the one end as a rotation center, the first guiding portion restricts a position of the one end,
the bracket includes
a first engaging portion configured to abut against the front surface portion on the side of the one end of the detection unit and hold the detection unit by sandwiching the detection unit with the bottom wall portion, and
when the detection unit is attached to the bracket by diagonally inserting the one end between the bottom wall portion and the first engaging portion and pivoting the detection unit about the side of the one end as the rotation center, the first guiding portion restricts the position of the one end.

5. The apparatus according to claim 4, wherein the bracket includes
a second engaging portion configured to abut against the front surface portion on the side of the other end of the detection unit in a width direction of the detection unit and hold the other end of the detection unit by sandwiching the other end of the detection unit with the bottom wall portion.

* * * * *